US011883938B2

(12) United States Patent
Mecklenburg

(10) Patent No.: US 11,883,938 B2
(45) Date of Patent: Jan. 30, 2024

(54) HANDHELD SETTING TOOL

(71) Applicant: RHEFOR GbR, Berlin (DE)

(72) Inventor: Arno Mecklenburg, Berlin (DE)

(73) Assignee: RHEFOR GbR, Berlin (DE)

( * ) Notice: Subject to any disclaimer, the term of this patent is extended or adjusted under 35 U.S.C. 154(b) by 240 days.

(21) Appl. No.: 17/619,714

(22) PCT Filed: Feb. 6, 2020

(86) PCT No.: PCT/EP2020/053023

§ 371 (c)(1),
(2) Date: Dec. 16, 2021

(87) PCT Pub. No.: WO2020/259870

PCT Pub. Date: Dec. 30, 2020

(65) Prior Publication Data

US 2022/0355451 A1 Nov. 10, 2022

(30) Foreign Application Priority Data

| | | | |
|---|---|---|---|
| Jun. 26, 2019 | (DE) | ..................... | 10 2019 004 422.3 |
| Aug. 8, 2019 | (DE) | ..................... | 10 2019 005 599.3 |
| Aug. 20, 2019 | (DE) | ..................... | 10 2019 005 792.9 |
| Sep. 25, 2019 | (DE) | ..................... | 10 2019 006 714.2 |

(51) Int. Cl.
*B25C 1/06* (2006.01)
*B25C 1/04* (2006.01)

(52) U.S. Cl.
CPC ................ *B25C 1/047* (2013.01); *B25C 1/06* (2013.01)

(58) Field of Classification Search
CPC .......... B25C 1/06; B25C 1/047; H02K 17/06; H02K 7/14
See application file for complete search history.

(56) References Cited

U.S. PATENT DOCUMENTS

| | | | | |
|---|---|---|---|---|
| 6,499,643 | B1 | 12/2002 | Hewitt | |
| 2009/0090759 | A1 | 4/2009 | Leimbach et al. | |
| 2010/0236802 | A1* | 9/2010 | Berger ................ | B25D 11/064 173/118 |

FOREIGN PATENT DOCUMENTS

| | | | |
|---|---|---|---|
| DE | 10 2007 000 219 A1 | 10/2008 | |
| DE | 10 2009 031 665 A1 | 2/2011 | |
| EP | 2 036 680 A2 | 3/2009 | |

(Continued)

OTHER PUBLICATIONS

International Search Report and Written Opinion for International Application No. PCT/EP2020/053023, dated May 27, 2020.

(Continued)

*Primary Examiner* — Nathaniel C Chukwurah
(74) *Attorney, Agent, or Firm* — Wolf, Greenfield & Sacks, P.C.

(57) ABSTRACT

A handheld setting tool for driving a nail or bolt into a substrate, comprising: a drive, preferably a gas spring drive or an electrodynamic drive, which drives an actuator, which actuator is used to drive the nail or bolt into the substrate; characterised by: a decoupling device which at least partially decouples a first movement process of a first moving part or piston in the actuator, driven by the drive, from a second movement process of a second moving part or piston in the actuator so as to drive the nail or bolt into the substrate.

17 Claims, 7 Drawing Sheets

(56) References Cited

FOREIGN PATENT DOCUMENTS

| | | | |
|---|---|---|---|
| WO | WO 2009/046076 | A1 | 4/2009 |
| WO | WO 2012/079572 | A2 | 6/2012 |
| WO | WO 2014/056487 | A2 | 4/2014 |
| WO | WO 2018/104406 | A1 | 6/2018 |
| WO | WO 2019/121016 | A1 | 6/2019 |

OTHER PUBLICATIONS

International Preliminary Report on Patentability for International Application No. PCT/EP2020/053023, dated Jan. 6, 2022.

* cited by examiner

HANDHELD SETTING TOOL

RELATED APPLICATIONS

This Application is a national stage filing under 35 U.S.C. § 371 of International PCT Application No. PCT/EP2020/053023, filed Feb. 6, 2020, which claims the benefit of German Patent Application No. 10 2019 006 714.2, filed Sep. 25, 2019, German Patent Application No. 10 2019 005 792.9, filed Aug. 20, 2019, German Patent Application No. 10 2019 005 599.3, filed Aug. 8, 2019, and German Patent Application No. 10 2019 004 422.3, filed Jun. 26, 2019.

TECHNICAL FIELD

The present invention relates to handheld setting tools for driving or setting a nail or bolt.

BACKGROUND

Setting tools or nail setting tools which store the energy required for the setting operation in a pretensioned gas spring are generally known, for example, from WO 2009/046076 A1 and are marketed by Senco under the trade name "Fusion Technology". Tools that work according to the same principle are also offered by HITACHI and are said to achieve driving energies or setting energies of 120 J.

Such nailers or nail setting tools ("pneumatic setting tools") are well suited to driving or setting nails into wood, but they have a number of disadvantages compared to combustion-powered setting tools that severely limit their range of application.

For example, pneumatic setting tools do not appear to be well suited to driving or setting bolts into solid substrates such as steel or concrete, due on the one hand to low driving energy or setting energy and on the other hand to the possible recoil. The latter can be illustrated by the following edge case: A nail of length s is to be driven into a substrate, but the substrate and the nail do not yield at all. In this case, the substrate forms a counter bearing for the relaxing gas spring. The relaxation of the gas spring then accelerates the pneumatic gun over the distance s during the setting operation, whereupon the gas spring, with its force F, performs work $w=\int(F*ds)$. With driving/setting energies such as those required for driving/setting into concrete and steel, this can soon lead to recoil energies with potentially disastrous results for the user. Recoil can also be a problem for electrodynamically driven setting tools.

Another deficiency of known pneumatic setting tools is their comparatively low driving energies and their relatively high weight and volume compared to combustion-powered setting tools with the same driving energy. This deficiency is essentially due to the comparatively low operating pressures of the devices. It is not without reason that WO 2009/046076 A1 expressly recommends low operating pressures between 100 psig and 120 psig, i.e. pressures corresponding to the usual operating pressures of pneumatic actuators: Enormous demands are made on the piston rings in pneumatic setting tools. They are supposed to keep the leakage-related pressure loss in the working gas reservoir, i.e. in the gas spring, at a negligible level over the entire service life of the setting tool, yet have to withstand extraordinarily high sliding velocities for pneumatic systems during the setting operation, and also cause minimal friction while sliding. If, for example, pressures of 1.2 kpsig were used instead of 120 prig, the contact pressures applied to the seals would have to be some ten times higher in order to achieve sealing, and the PV values of all piston seals commonly used in pneumatic applications would be far exceeded even at (for setting tools) moderate piston speeds of the order of 30 m/s. Therefore it is understandable that WO 2009/046076 A1 explicitly warns against operating pressures much higher than 120 psig.

In DE 10 2007 000 219 B4, the company HILTI suggested solving the sealing problem by means of a rolling diaphragm; however, the service life of such a diaphragm appears doubtful given the enormous dynamic stress to which it is exposed in the setting tool.

A further disadvantage of known pneumatic setting tools is that it is difficult to adjust the driving energy, whereas this can easily be achieved with, for example, combustion-powered tools. For example, in a setting tool driven by the combustion of an ignitable gas-air mixture, the amount of fuel injected can be varied. In powder-actuated tools, cartridges can be loaded with a propellant charge adapted to the application.

Finally, another disadvantage of known setting tools that have a piston drive is that they have a pronounced muzzle flip and recoil, which can reduce setting quality and place physical strain on the user.

SUMMARY

It is the object of the present invention to solve the problems referred to above.

These problems are solved by a handheld setting tool with the features according to claim 1. Preferred embodiments are defined in the dependent claims.

Further advantages and further embodiments of the invention will be apparent from the following detailed description and from the claims as a whole.

DESCRIPTION OF THE EMBODIMENTS

Figure 1:
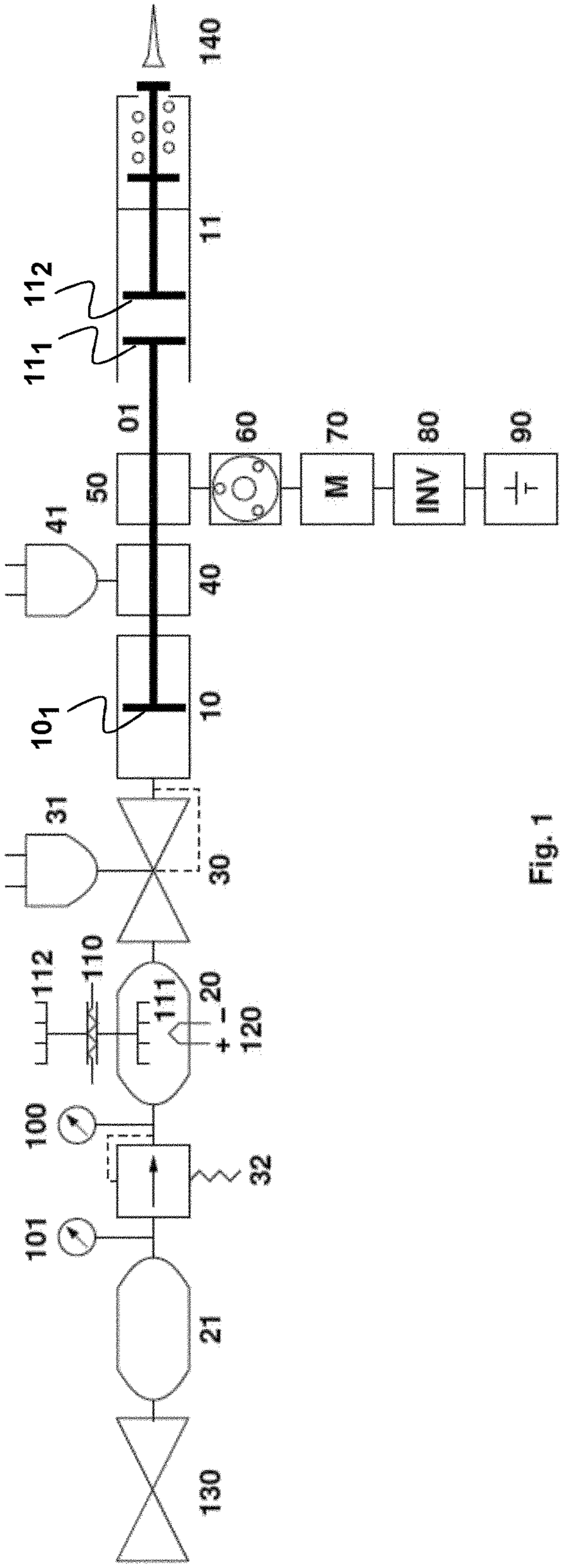
FIG. 1 shows a handheld setting tool according to one embodiment.

The invention is described below on the basis of further embodiments and examples, starting with known pneumatic and electrodynamically driven setting tools. The examples serve to provide a better understanding of the invention: in no way are they to be understood as restrictions. In the following description, the same reference numbers are used for the same or corresponding elements and repetitive description is largely avoided.

A handheld setting tool for driving or setting a nail or bolt into a substrate (e.g. steel or concrete) according to one embodiment comprises a drive or a piston drive, preferably a gas spring drive or an electrodynamic drive, which drives an actuator 11. The driven actuator 11 serves to drive the nail or bolt into the substrate. The handheld setting tool further comprises a decoupling device which at least partly or partially decouples a first movement process of a first moving part or piston $\mathbf{11}_1$ in the actuator 11, driven by the drive, from a second movement process of a second moving part or piston $11_2$ in the actuator 11 for driving or setting the nail or bolt. (To aid understanding, the reference numbers refer here only by way of example to features in FIG. 1, which shows a setting tool with a gas spring drive. However, the concept of the decoupling device can also be used for other drives, especially electrodynamic drives).

The decoupling device may advantageously be designed in such a way that kinetic or translatory energy (caused by the drive) of the first moving part or piston $11_1$ is transferred to the second moving part or piston $11_2$, and kinetic or translatory energy of the second moving part or piston $11_2$ is used to drive the nail or bolt.

The drive (gas spring drive or electrodynamic drive, as explained in detail below) thus serves to drive an actuator 11, in other words a stroke control element, which in this case can be configured as a pneumatic actuator.

The decoupling device here decouples a movement process of the first moving part (e.g. an armature) or the first moving piston $11_1$ effected by the drive (e.g. a translatory movement of the moving part/piston in a cylinder) from a movement process of the second moving part (e.g. a setting element) or the second moving piston $11_2$ (e.g. a setting piston).

Partial decoupling of the movement processes can be achieved, for example, by ensuring that a translatory movement of the first piston does not lead directly or synchronously or simultaneously to a translatory movement of the second piston, and vice versa. In other words, the movement process of the first piston preferably leads to a movement of the second piston only after a certain delay. An (immediate) recoil is therefore not directly transferred to the first piston and thus to the drive.

In an advantageous embodiment, the decoupling device may be formed in such a way that the first moving part or first moving piston $11_1$ is not rigidly connected to the second moving part or second moving piston $11_2$, or there is no direct contact between them. The person skilled in the art will recognise that, in this embodiment, a translatory movement of the first piston does not lead directly or synchronously to a translatory movement of the second piston.

In a further advantageous embodiment, the decoupling device may be formed by having a compressible fluid, e.g. air, between the first moving part or piston $11_1$ and the second moving part or piston $11_2$. Compared to an incompressible fluid, where a translatory movement of the first piston due to the incompressible fluid, e.g. lubricant, would directly or synchronously lead to a translatory movement of the second piston, a compressible fluid can at least partially decouple the movement processes of the first and second pistons. The person skilled in the art understands that, for example, only the attainment of a certain shorter distance between the first and second piston, combined with a compression of the compressible fluid, causes the moment of inertia of the second moving part or piston to be overcome, so that it can be moved for the setting operation.

Advantageously, a stroke length (distance between a first and second dead centre) of the first moving part or piston $11_1$ is independent of a stroke length of the second moving part or piston $11_2$. This allows the nail driving energy (nail setting energy) of the drive to be set independently of a setting stroke of the second moving part or piston $11_2$.

In a further advantageous embodiment, the actuator 11 may further comprise a cylinder, wherein the first piston $11_1$ and the second piston $11_2$ are disposed opposite one another in the cylinder, and wherein at least one piston seal is formed in the cylinder. The piston seals may be one or more piston rings and/or a gas dynamic seal. The gas dynamic seal is preferably of the labyrinth piston seal type (as will be explained further below).

In a further advantageous embodiment, the actuator 11 may further be designed such that a resetting device (e.g. a spiral compression spring) is formed for the second moving part or the second moving piston $11_2$. After driving (setting) the nail or bolt, the second moving part or the second moving piston can thus be returned to an initial position, largely independently of the first moving part or the first moving piston of the actuator 11.

In a further advantageous embodiment, the drive may comprise a further actuator 10. The actuator 10 is, for example, part of a gas spring (as further explained below) and is coupled to the first moving part or piston $11_1$ so that the driven further actuator 10 leads to the first movement process in the actuator 11. In this embodiment, the setting stroke of the second moving part or piston $11_2$ in the actuator 11 is independent of a travel of the further actuator 10, so that the nail driving energy (nail setting energy) can be set independently of the setting stroke with which the nail or bolt is driven.

FIG. 1 schematically illustrates the design of a setting tool according to a further embodiment. Its function is first explained on the basis of the following components and/or assemblies:

Actuator 11 with a first piston $11_1$ and a second piston $11_2$
Pneumatic actuator 10 with piston rod 01 and a third piston $10_1$
Working gas reservoir 20
Electrochemical energy store 90
Motor controller 80
Motor 70
Reduction gear 60
Tensioning device 50
Lock 40

The handheld setting tool shown in FIG. 1 is a setting tool with a gas spring drive which, in a further advantageous embodiment, has at least one working gas reservoir 20 with a working gas and wherein the actuator 10 is a pneumatic actuator. The pneumatic actuator 10 has a third piston $10_1$ connected to a piston rod 01. The third piston $10_1$ is in fluid communication with the working gas reservoir 20 and, together with the working gas reservoir 20, forms a gas spring.

The pneumatic actuator 10 is movable between a stroke start position range, in which the gas spring is under maximum tension, and a stroke end position range, in which the gas spring is at least partially relaxed. The person skilled in the art will recognise that this driven movement of the pneumatic actuator 10 causes a movement of the moving part or piston $11_1$ in the actuator 11 (first movement process), but this movement is at least partially decoupled from the movement of the second moving part or piston $11_2$ (second movement process).

In other words, the pneumatic actuator 10 (first actuator), together with the working gas reservoir 20, forms a pretensioned gas spring and thus the gas spring drive. To tension the gas spring, the motor 70 is supplied with electricity from the energy store 90 (e.g. a rechargeable battery or fuel cell) via the motor controller 80. The motor 70 drives the reduction gear 60. The reduction gear 60 drives the tensioning device 50. The tensioning device 50 translates the rotational movement of the reduction gear 60 into a translatory movement, acts on the piston rod 01 of the pneumatic actuator 10, and moves its piston in such a way as to convey working gas from the pneumatic actuator 10 into the working gas reservoir 20, i.e. to tension the gas spring. The lock 40 is able to lock the gas spring in the tensioned state. In order to drive the nail or bolt 140, lock 40 is released, for example by means of an electromagnetic actuator 41. The volume that is displaced by the piston of the pneumatic actuator 10 when the gas spring is tensioned is referred to as the stroke volume.

Further optional components of a setting tool according to FIG. 1 are explained below:

Reference number 30 represents a valve which is able to connect the working gas reservoir 20 and the pneumatic actuator 10 to one another. It can be positively controlled with a fast electromagnetic actuator 31, e.g. according to DE 10 2009 031 665 A1, plus a spring, to conduct a gas pulse from the working gas reservoir 20 into the actuator 10 and close it again before the driving process is completed, the valve preferably opening automatically when the pressure in the displacement chamber of the actuator 10 exceeds a certain value which is greater than the pressure in the working gas reservoir 20. The person skilled in the art understands that the recoil of the tool can be reduced in this way when driving into solid substrates, and the user can vary the nail driving energy by selecting the valve opening time; however, this is at the expense of the tool's electrical efficiency. The valve 30 can preferably also be formed by the piston of the actuator 10, which then serves as a shut-off element or has such an element, the cylinder of actuator 10 being designed to incorporate a valve seat, sealing being effected with the aid of force from the lock 40, which can, for example, have a spring or be of resilient design in order to generate force (this variant will be explained later with reference to FIG. 2).

Reference number 120 represents a thermocouple that can be used to measure the temperature in the working gas reservoir 20. Reference number 100 represents a manometer, in particular an electric or electronic manometer, with which the static pressure in the working gas reservoir 20 can be measured. Reference number 21 represents a second working gas reservoir which is normally subject to overpressure in relation to working gas reservoir 20 and whose static pressure can be measured, for example, by means of a manometer 101. The purpose of working gas reservoir 21 is to compensate for any leakage losses in working gas reservoir 20. This can be achieved via a pressure reducing valve 32. For temperature compensation, the working gas in working gas reservoir 20 can be heated or cooled, for example by a Peltier element 110 (in place of which a heat pump can also be used, for example), which also creates a thermal connection between the working gas in working gas reservoir 20 and the environment with the cooling or heating elements 111 and 112. Reference number 130 further shows a valve via which working gas reservoir 21—the "top-up reservoir"—can be filled with working gas from outside.

In a particularly advantageous embodiment, the piston of actuator 10 with piston rod 01 does not itself act (directly) on the nail or bolt 140 to drive it in. Instead, the actuator 10 acts with its piston rod 01 on a striking mechanism, whereby kinetic energy (including parts mechanically connected thereto) of the actuator 10 can be transferred from the first piston (e.g. piston $\mathbf{11}_1$ in FIG. 1) to a moving part, for example a second piston (e.g. piston $\mathbf{11}_2$ in FIG. 1), and the nail or bolt 140 is driven wholly or predominantly by the kinetic energy of the moving part, the first piston $\mathbf{11}_1$ and the moving part or second piston $\mathbf{11}_2$ not being rigidly connected to one another ("decoupling device").

For example, a first piston $\mathbf{11}_1$ is driven with the help of actuator 10 (first actuator) via piston rod 01 in a further pneumatic actuator 11 ("striking mechanism", second actuator), which can be filled with air (ambient pressure), for example. In addition to the first piston $\mathbf{11}_1$, the pneumatic actuator 11 has a second piston $\mathbf{11}_2$, as shown in FIG. 1. As explained, the first piston $\mathbf{11}_1$ can be driven by actuator 10, and is, for example, single-acting. The second piston $\mathbf{11}_2$ of actuator 11—at least partially decoupled from the first piston $\mathbf{11}_1$ by means of a decoupling device—is preferably double-acting and equipped with a resetting device, shown here for example in the form of a spiral compression spring.

To achieve sealing, the first and second pistons of actuator 11 can be designed in the manner of pistons of labyrinth piston compressors, so that the necessary—temporary—sealing can be effected gas-dynamically.

To drive a nail or bolt 140, by releasing lock 40, the piston rod 01 and thus the piston of actuator 10 as well as the first piston $\mathbf{11}_1$ of actuator 11, which is connected to piston rod 01, can be accelerated by the pretensioned gas spring. This increases the pressure between the first and second piston of actuator 11 almost exponentially: momentum and kinetic energy are transferred by the gas buffer formed between the first and second piston of actuator 11 from the directly gas-spring-driven part of the setting tool (piston $\mathbf{10}_1$ of actuator 10, piston rod 01, first piston $\mathbf{11}_1$ of actuator 11) to the second piston $\mathbf{11}_2$ of actuator 11 and consequently also to its piston rod and associated parts (for example the return spring). This requires the moving masses to be expertly matched with one another, taking any reduced masses into account. The nail or bolt 140 is thus ultimately driven via the piston rod of the second piston $\mathbf{11}_2$ of actuator 11. If this second piston $\mathbf{11}_2$ of actuator 11 is double-acting, i.e. if the side of the cylinder of actuator 11 facing the nail is closed sufficiently tightly, a second fluid or gas cushion for returning the second piston can be built up during a setting operation in the cylinder of actuator 11 on the side of the second piston $\mathbf{11}_2$ facing the nail (as shown in FIG. 1). This prevents a hard striking of the second piston 11 of actuator 11 on the nail or bolt 140.

There should be a clearance between the piston rod of the second piston $\mathbf{11}_2$ of actuator 11 driving the nail or bolt 140 and the nail 140 itself in order to allow sufficient momentum transfer (preferably at least 50%) from the first to the second piston of actuator 11 before the acceleration and eventual driving of the nail even begin: the driving energy preferably comes mostly from the kinetic energy of the second piston of actuator 11 (including its piston rod etc.).

In order to achieve an actuator 11 of short overall length and/or to necessitate only a small clearance between the piston rod and the nail, the energy transfer from the first to the second piston of actuator 11 should be as abrupt as possible, which can be achieved in at least two practicable ways: (i) Firstly, one or more vent openings may be disposed in the cylinder such that the first piston can start to move and convey gas or air through this (these) opening(s), for example into the tool housing, so that initially the movement of the first piston does not lead to a significant increase in pressure in the space between the first and second pistons. Only when the first piston $\mathbf{11}_1$ in the actuator 11 accelerated by the piston drive or its actuator 10 passes over the vent openings are these openings largely closed, as a result of which a much greater, in particular steeper-flanked, pressure increase can occur in the space between the two pistons of the actuator 11 than would be the case in the absence of the vent opening(s). (ii) Secondly, the second piston $\mathbf{11}_2$ of actuator 11 can be blocked by means of a mechanism such that it can only start to move after exceeding a certain breakaway force. Such mechanisms can operate in a formfitting or force-fitting manner and are known, for example, from so-called force limiters and from the breechblocks of guns. Both variants can be combined with one another.

Actuator 11 makes the setting stroke and the travel by which the pre-tensioned gas spring (formed by actuator 10 and working gas reservoir 20) is tensioned largely independent of one another. This makes it easier to provide variable driving energies: it is merely necessary to adjust the travel by which the gas spring is tensioned, and thus the stroke volume, accordingly. This does not change the setting stroke, which is determined by actuator 11.

Further aspects of embodiments relating to design features of components of setting tools according to the invention are explained below.

Figure 2:
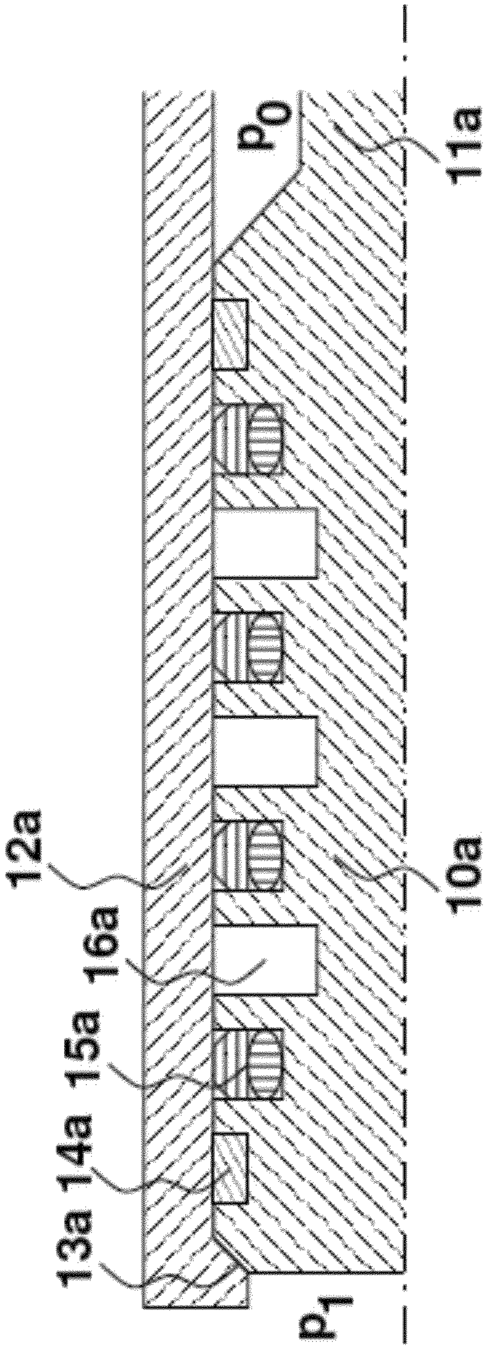
FIG. 2 shows an actuator according to one embodiment.

FIG. 2 shows a possible further embodiment of a pneumatic actuator 10 (first actuator) from FIG. 1 for the gas spring.

As explained in detail below, the third piston 10*a* comprises a plurality of piston rings 15*a*, wherein cavities 16*a* are arranged axially, i.e. along the direction of movement of the third piston 10*a*, between the piston rings 15*a*, or the piston is configured to have such cavities, the cavities 16*a* being preferably partially, but not completely, filled with an incompressible fluid.

In FIG. 2, piston 10*a* with piston rod 11*a* is disposed in cylinder 12*a*. Cylinder 12*a* is configured to incorporate a valve seat 13*a* towards the high pressure end p1, i.e. towards the working gas reservoir. Piston 10*a* is configured as an associated shut-off element. Provided that tensioning device 40 from FIG. 1 is able to exert sufficient contact pressure on piston 10*a* in the locked state, preferably by means of a spring, the working gas reservoir is additionally sealed in the locked, tensioned (ready to fire) state by the valve (formed by the piston and cylinder as described). The role of the valve here is therefore the same as that of valve 30 in FIG. 1. Piston rod 11*a* in FIG. 2 is identical to piston rod 01 in FIG. 1.

In FIG. 2, piston 10*a* has, for example, two piston guide rings 14*a*. A characteristic of preferred pistons according to FIG. 2, however, is that piston 10*a* further has a plurality of piston rings 15*a*, whose contact pressure can be applied, for example, by O-rings, but also by all other known ways and means. FIG. 2 shows four piston rings 15*a*, but more or fewer piston rings 15*a* can be provided. Between each of the piston rings 15*a*, the piston 10*a* is further configured to have a plurality of cavities 16*a*. Preferably, these cavities are partially, but not completely, filled with a liquid lubricant.

The plurality of cavities in the form of a cascade (i.e. cavities one after another so that the effect of each cavity is derived from a preceding cavity and acts on a succeeding cavity), as well as providing reliable lubrication, also allow the pressure being sealed to be evenly distributed among the various seals. The contact pressure per seal can be reduced accordingly, therefore the p*v stress of each individual seal can be lessened accordingly. In the initial stroke position shown in FIG. 2, the valve formed by cylinder 12*a* and piston 10*a* is closed. Therefore, in this position, working gas must first pass through the valve and then through the entire cascade of lubricated piston rings and cavities in order to escape from the working gas reservoir at pressure p1 towards the low pressure side p0. Only during a setting operation until the subsequent, complete return of piston 10*a* to its stroke starting position is the leakage determined by the cascaded, "buffered" and lubricated piston rings (mechanical seals).

It is proposed that piston 10*a* and cylinder 12*a* be made from a sufficiently tough, hard, particularly wear-resistant and highly polishable steel. Highly suitable materials include steels such as 1.4108, i.e. cold-work steels and in particular pressure-nitrided steels with a very fine martensitic structure, further characterised by the absence of coarse-grained carbides or carbonitrides, where "coarse-grained" is understood to mean a maximum extension in one direction of more than 20 μm and preferably more than 10 μm, including in the case of linearly precipitated carbides.

Preferably, when using steel 1.4108 (material number) for piston 10*a* and cylinder 12*a*, a slightly higher Rockwell hardness is set for cylinder 12*a* than for piston 10*a* (e.g. 56-58HRC for the piston, 58-60HRC for the cylinder or its running surface) by means of an appropriate tempering treatment.

In addition to the cold-work steels mentioned above, newer materials that can be processed to near net shape using additive manufacturing methods (e.g. laser sintering) are also particularly suitable for pistons and/or cylinders. In particular, very hard powder-metallurgical steels of sufficient toughness (e.g. Vibenite 290) and metallic glasses based on elements of the fourth group should be mentioned here.

Piston 10*a* and the running surface of cylinder 12*a* can very preferably be coated with hard material layers or tribological layers. CVD-deposited, predominantly tetrahedrally coordinated carbon (ta-C) is particularly suitable for coating cylinder 12*a* or its running surface. Suitable coatings for the piston 10*a* are also ta-C, but also a-C/WC, TiN, TiMoN (as solid phase solution or MoN/TiN "superlattice"), TiN—MoS2, as well as the nitrides, carbides and carbonitrides of Cr, Ti, Zr, Hf and also aluminium oxide (and/or aluminium oxynitride) in amorphous form or as nano- or microcrystalline corundum. Particularly suitable materials for the piston rings are expertly selected, in particular temperature-resistant and abrasion-resistant plastics from the group of polyetheretherketones (PEEK) and/or polyimides (PI), and/or ultra-high molecular weight polyethylene (UHMWPE), and/or liquid-crystalline polyethylene terephthalate, preferably filled with solid lubricants such as PTFE and/or graphite and/or hexagonal boron nitride (hBN) and/or MoS2, and if necessary (in particular ceramically) reinforced, in particular with glass fibre, carbon short fibre, pyrogenic silica; further preferably, the piston ring material is also selected to have a low coefficient of sliding friction with the friction partner, i.e. the running surface of cylinder 12*a*, and preferably not to form any significant adhesion with the latter, and even to have relatively high thermal conductivity and a low coefficient of thermal expansion. Carbon-based materials are particularly suitable for the guide rings, for example antimony-impregnated graphite.

A skilled implementation of an actuator 10 (from FIG. 1) as shown in FIG. 2 readily allows operation at exceptionally high pressures (e.g. at least 10 bar, more preferably at least 20 bar, more preferably at least 40 bar, more preferably at least 60 bar, more preferably at least 80 bar, more preferably at least 100 bar, and more preferably at least 120 bar) and piston speeds (e.g. at least 30 m/s, preferably more than 50 m/s) without compromising the impermeability of working gas reservoir 20 (from FIG. 1).

Figure 3:
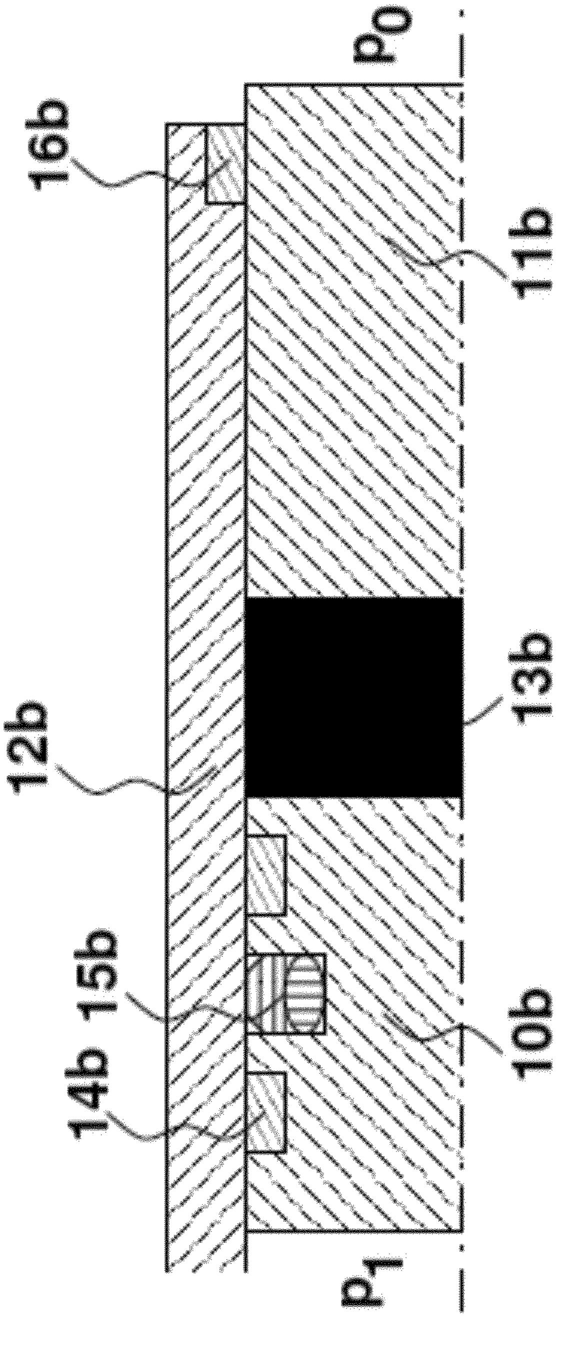
FIG. 3 shows an actuator according to one embodiment.

FIG. 3 shows a possible further embodiment of a pneumatic actuator 10 (first actuator) from FIG. 1.

As explained in detail below, the pneumatic actuator 10 comprises, in addition to the third piston 10*b*, a fourth piston 11*b*, wherein a reservoir 13*b* is formed between the third piston 10*b* and the fourth piston 11*b*, which reservoir 13*b* is filled with an incompressible fluid which preferably has the properties indicated below and is adapted to the working gas as explained below.

This embodiment according to FIG. 3 thus shows a completely different and novel way of realising the seal of a gas spring. The piston $10_1$ connected to or even identical to the piston rod 01 of actuator 10 (from FIG. 1) is referenced 11*b* in FIG. 3. In addition, there is a second piston 10*b* which has, for example, two guide rings 14*b* and, for example, a piston ring 15*b*. The two pistons 10*b* and 11*b* are not rigidly connected to one another. 12*b* represents the cylinder of the pneumatic actuator (first actuator 10). A reservoir 13*b* is furthermore disposed between the two pistons in cylinder 12*b*, which is filled with a fluid (incompressible fluid). This is preferably a liquid lubricant in which polymers or oligomers are dissolved and/or solid lubricants such as MoS2 and/or hBN and/or graphite are dispersed, possibly with the addition of stabilisers, such that the fluid has pronounced shear-thinning properties and possibly also exhibits thixotropic properties (thixotropy of the fluid in reservoir 13*b* can mechanically relieve lock 40 during unlocking). Reference number 16*b* refers to a sealing ring, for example a so-called armoured carbon ring. For the selection of materials relating to the pistons and the cylinder, including any coatings, the same applies as indicated above in relation to FIG. 2. The person skilled in the art will recognise that this seal is not a decoupling device (as explained above) since the pistons 10*b* and 11*b* are not decoupled via the incompressible fluid, but move synchronously with one another. A movement of the piston 10*b* leads directly to a movement of the piston 11*b* and vice versa.

Figure 4C:
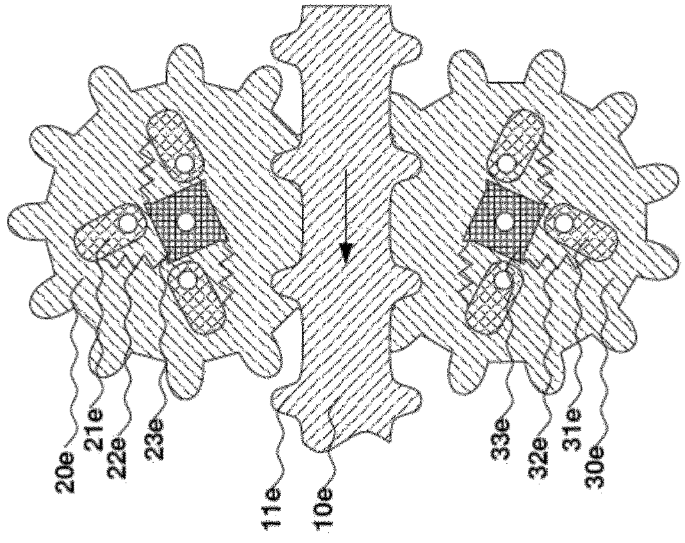
FIGS. 4*a*-4*c* show an embodiment of a tensioning device.
Figure 4B:
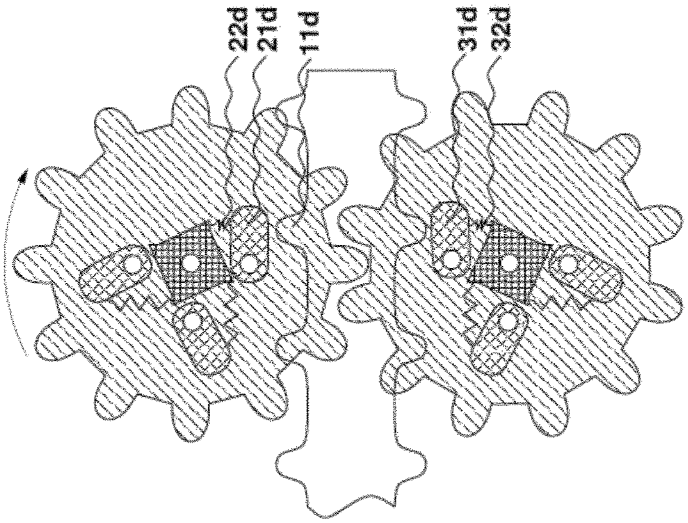
Figure 4A:
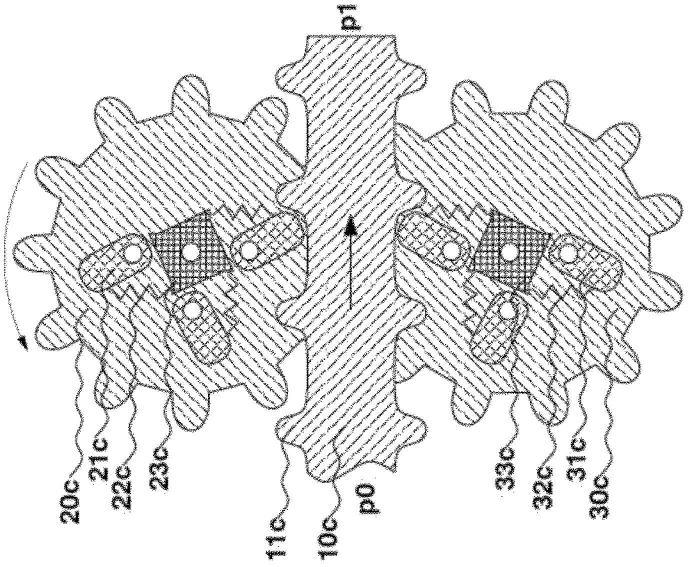

FIGS. 4*a*-*c* show a possible embodiment of the tensioning device with reference number 50 in FIG. 1, which moves the piston 10 (FIG. 1). In FIG. 4*a*, 10*c* denotes the piston rod 01 of FIG. 1, 11*c* a lifting member of the piston rod, 20*c* and 30*c* two intermeshing gear wheels with freewheel devices thereon consisting of components 21-23*c* and 31-33*c* respectively (reference numbers in FIGS. 4*b* and 4*c* are analogous, with suffixes d and e).

The gear wheels can be rotated by an electric motor with reference number 70 in FIG. 1 via a reduction gear 60, it being sufficient to drive one of the two intermeshed gear wheels. A particularly suitable gearbox 60 is a planetary, preferably multi-stage, gearbox (all stages in two-shaft operation). By engaging the freewheel device in the piston rod, the rotational movement of gearbox 60 and thus also of the gear wheels can be converted into a linear movement. The three illustrations symbolise different operating states of the tensioning device.

FIG. 4*a* shows the tensioning process in which the piston rod is moved against the working gas (over)pressure p1 in the pneumatic actuator 10 (FIG. 1). Here, the travel of the piston and hence the energy stored in the gas spring can be selected: After reaching the desired piston position, the piston rod is locked against the force of the gas spring by means of the locking unit 40 (FIG. 1). The gear wheel 20*c* with ratchet freewheel is driven in a first direction of rotation (by motor 70 via gear 60 from FIG. 1); gear wheel 30*c* meshed with 20*c* is thereby moved with it, but can also be driven by a motor in the same way as 20*c*. Force is transmitted to the piston rod 10*c* via the ratchet freewheel 21*c*/22*c*/23*c* or 31*c*/32*c*/33*c*. With the force transmission shown on both sides, transverse loads on the associated bearings and/or seals on the piston and/or piston rod 10*c* can be avoided or reduced. In principle, however, a one-sided drive, for example via gear wheel 20*c* only, is sufficient.

FIG. 4*b* shows an opposite direction of rotation in which the piston rod is not driven, as the driving members of the freewheel do not mesh with the lifting members of the piston rod. Thus, by operating the electric motor 70 in the opposite direction via the intermediate position shown in FIG. 4*b*, a position as shown in FIG. 4*c* can be reached in which any contact between the piston rod 10*e* and the freewheel 21-23*e*/31-33*e* on the gear wheels 20*e*/30*e* is avoided. During a setting operation, i.e. an abrupt axial movement of the piston rod 10*e* in the direction of the arrow, contact between the driving and lifting members is thus prevented. The gear wheel position in FIG. 4*c* can be ensured, for example, by the self-locking effect of the drive (motor 70 with high transmission ratio 60 from FIG. 1); no additional locking device is required.

The ratchet freewheel comprises driving members 21*c*, which are rotatably mounted and have a stop or some form of detent, whereby in one direction of rotation of 20*c* the piston rod 10*c* is moved with it when driving member 21*c* and lifting member 11*c* of the piston rod intermesh. In the opposite direction of rotation of 20*c*, however, driving member 21*c* can be moved over the lifting members 11*c* largely without resistance by moving the driving member about its axis of rotation sufficiently to allow the lifting member to pass. This condition is shown in FIG. 4*b*: driving member 21*d* gives way to lifting member 11*d*.

The driving members are preferably formed as ratchets of a ratchet freewheel and can be configured to match corresponding lifting members (e.g. "teeth") on the piston rod, thereby avoiding linear loads between driving and lifting members as far as possible and aiming for surface loads (Stribeck pressure rather than Hertzian stress).

In addition to the driving members and their rotatable mounting with stop/detent device, the freewheel also includes means for returning the driving members from a give-way position (as shown in FIG. 4*b* based on the relative positions of 21*d* and 11*d*) to a driving position (as shown in FIG. 4*a*). Such means can be, for example, springs 22*c* with a counter bearing 23*c*. A possible embodiment would be, for example, torsion springs (leg springs) coaxial with the rotatable mounting of the driving members, one spring leg being permanently connected to the driving member and the second leg to the gear wheel 20*c*.

By means of actuator 11 (second actuator) from FIG. 1, it is now possible to adjust the driving energy independently of the setting stroke simply via the travel and thus the stroke volume by which the gas spring is pretensioned. Piston rod 01 preferably has a stiffening means perpendicular to the lifting members with which the driving members of tensioning device 50 intermesh or engage. This stiffening means serves to increase the buckling force which piston rod 01 can safely withstand; at the same time, it can be configured to have latching elements with which the lock 40 can engage. As an additional stiffening means, the piston rod can be configured to have stiffening rings.

Figure 5:
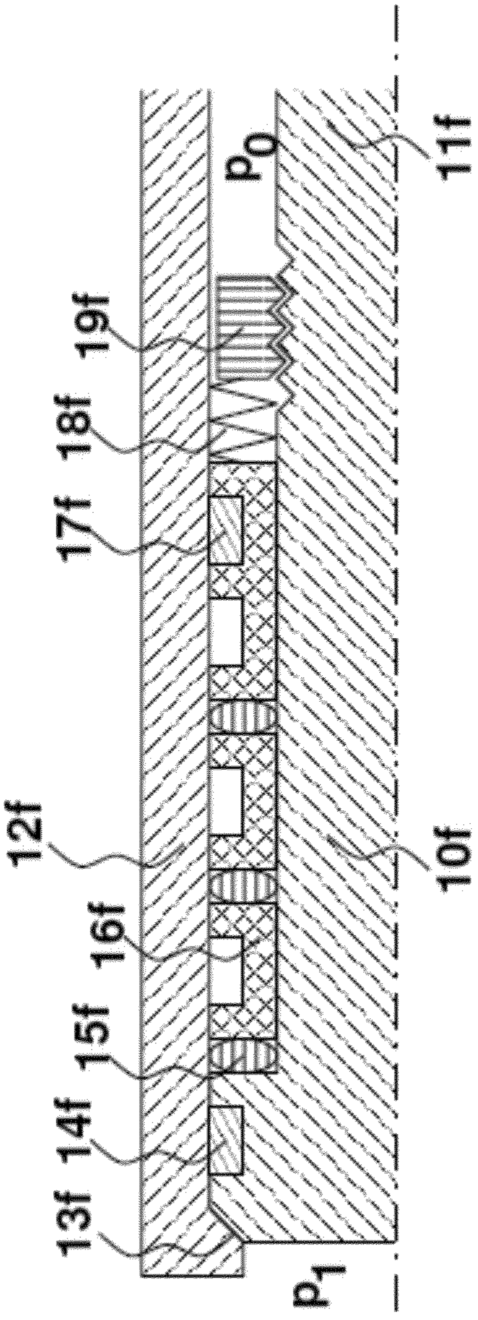
FIG. 5 shows an actuator according to one embodiment.

FIG. 5 shows a further alternative embodiment of an actuator, in particular an easily implementable variant of an actuator 10 (first actuator) from FIG. 1 according to FIG. 2.

As explained in detail below, the pneumatic actuator 10 here comprises a cylinder 12*f*, the cylinder 12*f* being configured to incorporate a valve seat 13*f*, the third piston 10*f* being configured to act as a shut-off element for this valve seat or to incorporate a corresponding shut-off element, so that the third piston 10*f* and the cylinder 12*f* together form a valve which can be closed by pressing, by means of sufficient external force, the third piston 10$f$ and thus the shut-off element against the valve seat 13$f$ formed by or attached to the cylinder 12$f$.

In FIG. 5, 13$f$ thus denotes the valve formed by piston 10$f$ and cylinder 12$f$, while 14$f$ and 17$f$ are guide rings (e.g. made of antimony-impregnated graphite), and 15$f$ are piston rings e.g. made of the sealing materials discussed above in relation to FIG. 2. Reference number 16$f$ represents rings with a U- or double-U-profile, which form the cavities explained above in relation to FIG. 2, preferably partially filled with lubricant; these rings are, as it were, threaded onto the piston via piston rod 11$f$. The pressure required for sealing can then be applied using the force of the pre-tensioned (disc) spring pack 18$f$ and a nut 19$f$. Preferably, there is a thread locking agent in the thread of nut 19$f$, which may be filled with metal powder.

Further aspects relating to embodiments of the invention which are particularly helpful in enabling the person skilled in the art to carry out the invention are explained below:

For the motor 70, so-called brushless DC motors, preferably those of axial flux type, are particularly suitable. These achieve the highest power densities with high electrical efficiencies, and their polarisation by the permanent magnets causes a sufficient cogging torque—after reduction by gear 60—to hold a tensioning device 50 according to FIGS. 4$a$-$c$ securely in the state shown in FIG. 4$c$; this means that the person skilled in the art does not have to rely on self-locking by the inherent friction of gear 60, nor is it necessary to provide an additional lock (besides lock 40) for the tensioning device 50. The motor 70 can advantageously be configured asymmetrically to have a higher electrical efficiency at a rated shaft power in the direction of rotation in which the gas spring is tensioned (i.e., for example, in which the freewheel device engages with piston rod 01). The motor 70, as well as the motor controller 80, can be cooled actively or passively with air; for particularly demanding applications with especially high driving frequencies and/or driving energies, evaporative cooling can also be used to cool both assemblies.

The working gas reservoir 20 preferably encloses a volume Va, to which the following applies with regard to the maximum stroke volume Vh of actuator 10 in FIG. 1: preferably Va>=Vh, more preferably Va>=2*Vh, more preferably Va>=3*Vh and more preferably Va>=4*Vh. The operating pressure in working gas reservoir 20 in the fully pressurised state is preferably at least 10 bar, more preferably at least 20 bar, more preferably at least 40 bar, more preferably at least 60 bar, more preferably at least 80 bar, more preferably at least 100 bar, and more preferably at least 120 bar. Maraging steels are particularly suitable as materials for the working gas reservoir(s). Among these steels, corrosion-resistant (colloquially "stainless") types are particularly preferable, or appropriate corrosion protection must be provided by other means. Alternatively, fibre-reinforced plastics can be used instead of steel, which can also be provided with one or more diffusion barrier layers to prevent diffusion losses. Heat-treatable wrought aluminium alloys such as aluminium 7068 and titanium alloys such as Ti-6Al—V4 are also suitable materials for the working gas reservoirs.

Nitrogen that is as dry as possible is suitable as working gas ("as dry as possible" is here to be understood as meaning that dew formation can be reliably excluded over the entire operating range). The use of light gases (which de facto means helium, since hydrogen is hardly an option due to its reactivity [flammability, possibly also the danger of hydrogen embrittlement]) instead of nitrogen offers the advantage that, due to their high sonic velocity, the gas dynamics play a subordinate role even at relatively very high piston speeds: With heavy gases and high piston speeds, during a driving process resulting from the piston movement a not insignificant drop in the working gas pressure felt by the piston head (the working piston of actuator 10) initially occurs, followed by a pressure increase ("overshoot") during the subsequent abrupt deceleration of the piston; this process is associated with irreversibilities, thus reducing efficiency, and also distributes force unfavourably over the travel of the gas spring.

On the other hand, polyatomic gases, and in particular more than diatomic gases such as $CF_4$, offer the advantage of having a lower isentropic exponent, which, given the same initial conditions and the same compression ratio, leads to a lower temperature increase of the working gas during compression (i.e. the tensioning of the gas spring) and thus to lower heat losses—and consequently to lower irreversibilities—than is the case with monatomic gases. Gas mixtures should also be considered. For example, $CO_2$ can be added to nitrogen to increase the isentropic exponent of the gas mixture. The use of $CO_2$ as working gas (working medium) also offers the advantage of being able to store working medium at a very high density in a top-up reservoir (reference number 21 in FIG. 1) to compensate for leakage losses. In view of the high operating pressures according to the invention, in the design of the gas spring it should preferably be taken into account that the respective working gases can no longer be regarded as ideal gases: cohesion pressure and covolume do not disappear. In any case, it is preferable to match the working gas (whether a pure gas or a mixture) with piston rings and lubricants: the working gas or gases should dissolve as little as possible in them and exhibit minimal diffusivity in them in order to achieve a minimal leakage rate. A leakage rate is here to be considered minimal if the setting tool allows at least 10,000 setting operations under all usual ambient conditions and can be stored for at least 5 years without the need to top up the working gas.

The cylinder and working gas reservoir can be understood as a piston drive and suffer from a fundamental problem where setting tools with setting pistons are concerned: the abrupt movement of the piston mass can cause a pronounced muzzle flip of the setting tool during the setting operation, in particular while the nail or bolt is being driven, which can reduce setting quality.

With regard to fastening quality, this problem is also generally known and has previously been addressed, see e.g. WO 2019/121016 A1.

The strong muzzle flip and recoil also place a high physical strain on the operator. The reason for the muzzle flip is, on the one hand, that the extended movement path of the piston's centre of gravity does not usually meet the centre of gravity of the setting tool. On the other hand, holding the setting tool by a handle, which is also next to the movement path of the piston's centre of gravity, gives a pivot point D1 (constraint). A known result is that the setting tool bounces up and back harshly during a setting operation, and also while driving in. The present invention is not immune to this problem.

Figure 6:
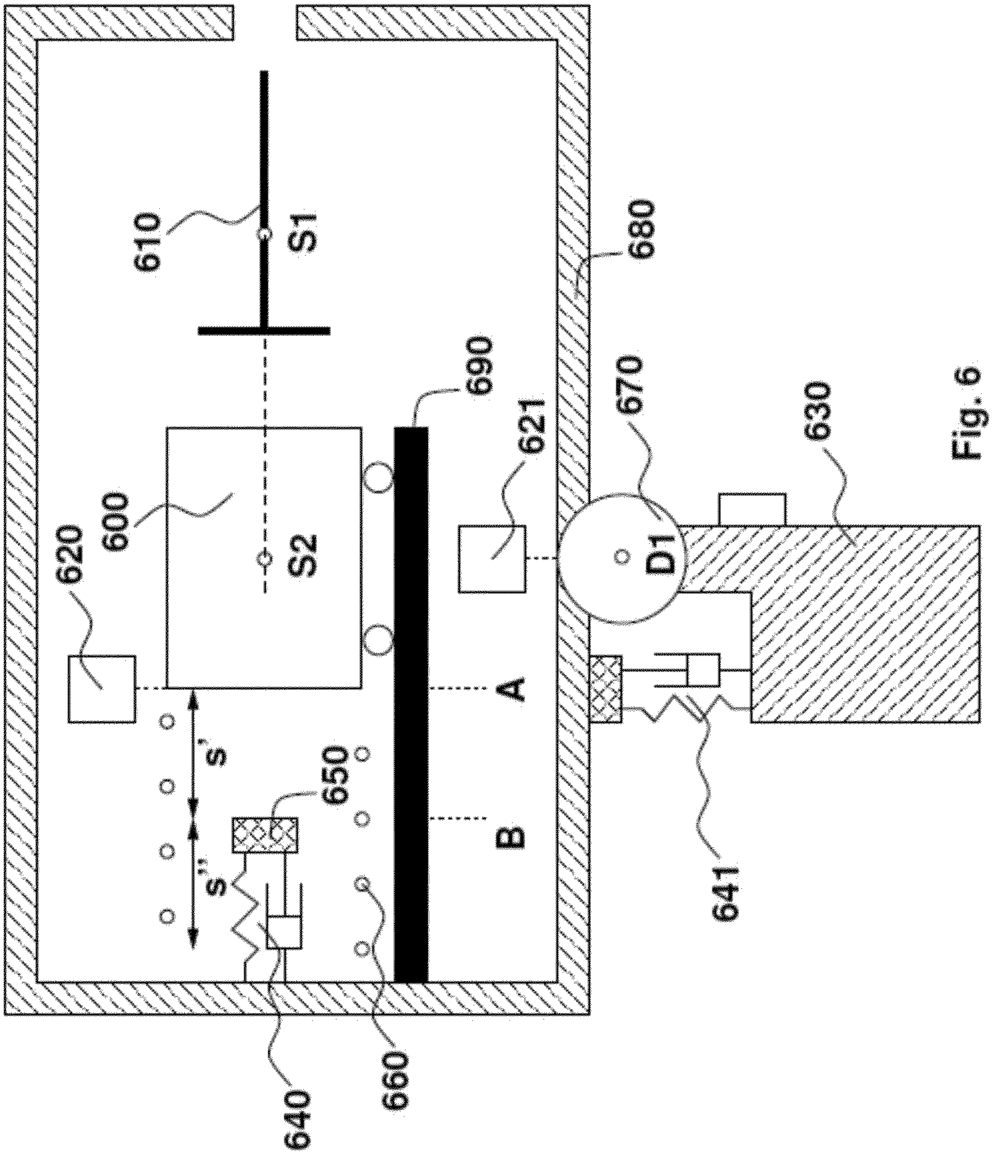
FIG. 6 shows a handheld setting tool according to one embodiment.

However, the described problem can at least be largely remedied, as shown below by way of example, such example again being in no way to be understood as restrictive:

FIG. 6 shows a further preferred embodiment of a hand-held nail setting tool according to the invention.

The setting piston 610 (e.g. the second moving part or piston $\mathbf{11}_2$ (from FIG. 1) when using the decoupling device)

here has at most a quarter of the mass of the drive 600. Particularly advantageously, the drive 600 is disposed so as to be axially movable in the setting tool, for example on guides 690.

The piston drive 600 (e.g. gas spring drive, electrodynamic drive or similar) is thus configured here such that, on the one hand, it has a substantially higher mass than the piston 610 itself, preferably at least four times the mass and particularly preferably more than ten times the mass.

The piston drive 600 (here this may include, for example (see FIG. 1) motor 70, reduction gear 60, tensioning device 50, lock 40, the piston of actuator 10 possibly with valve 30 and working gas reservoir 20) is movably disposed in or on the setting tool along the axis of movement of the piston 610, for example with the aid of one or more rails or other guides 690, the extended path of movement of the piston's centre of gravity S1 preferably passing through the centre of gravity S2 of the piston drive 600, insofar as this is possible in terms of design and within the limits of manufacturing accuracy, and the piston drive 600 having at least one stroke starting position A and a stroke end position range B. If no setting operation is taking place, an additional lock 620 fixes the piston drive in a stroke starting position A in relation to the other parts of the setting tool and in particular in relation to its handle 630. During a setting operation, lock 620 is released either actively (e.g. with the aid of an actuator) or passively (e.g. by the recoil itself), as a result of which the piston actuator 600 is initially enabled, during the setting operation, to return by a certain travel distance s'. The travel s' is particularly preferably dimensioned so that the driving of the nail or bolt is completed before the travel is "used up", i.e. before piston drive 600 has moved backwards by travel s'. Shock absorber 640 (e.g. hydraulic damper with elastomer stop 650 and return spring 660) then starts to take effect and to brake the piston drive 600 (which may be connected to motor controller 80 of FIG. 1 via flexible stranded wires, for example) over a damping distance s". Shock absorber 640 is preferably operated at the aperiodic limit. The described arrangement requires a resetting device to move piston drive 600 back to a stroke starting position after a setting operation and detain it there with the aid of lock 620. The simplest way of achieving this is by means of a spring, in particular a spiral compression spring or wave spring, analogous to the so-called firing springs of self-loading firearms. In the case of setting tools with a propellant charge, the return energy can also be partially used in a known manner for "ammunition conveyance" (cartridges, nails). During the damping of the return stroke of piston drive 600, the user experiences a torque on the handle 630 of the setting tool which, among other things, places mechanical strain on the wrist. This torque can likewise be reduced for the benefit of the operator by configuring the handle 630 of the setting tool so as to be rotatably connected, for example by means of a joint 670, to the housing 680 of the setting tool, in which the piston drive 600 is movably disposed. This rotational movement can in turn be damped and reset, which is possible with the aid of polymer dampers as well as with the aid of one or more hydraulic shock absorbers 641 with resetting spring or springs; a lock 621 analogous to lock 620 is possible and may be advantageous. This lock, if present, preferably unlocks immediately before the still returning piston drive 600 is damped and in particular after (!) the setting operation has been completed. After the return to the stroke starting position, for example via the spring of the second damper 641, lock 621 closes.

In contrast to the state of the art, the described method not only improves nail driving quality but also greatly reduces the bio-mechanical stress on the operator, especially with regard to force peaks occurring during the setting operation, which can prevent fatigue and injuries.

Due to the components necessary to realise this method, a setting tool that is damped using the above method is naturally heavier than one that is undamped. However, the additional weight is likely to be in the range of 3 . . . 10% of typical setting tools. Setting tools designed according to the main claim of this application are characterised by a high nail driving energy density and can in any case be more lightly constructed than conventional pneumatic setting tools, for example. The piston drives of combustion-powered and in particular powder-actuated setting tools as well as those based on electrodynamic drives (e.g. Thomson coils) can have very high gravimetric nail driving energy densities and/or very high rates of force increase on the piston, so that the damping method described above also appears particularly useful for such devices to protect operators from fatigue and injury. The latter may become even more relevant in the future due to stricter occupational health and safety requirements.

Due to friction and, where applicable, the force of, for example, a return spring 660, a certain, slight muzzle flip will still result due to the holding of the handle 630 and the resulting centre of rotation D1 at the joint 670; to reduce this further, the extended path of the centre of gravity S1 of piston 610 cannot be guided exactly through the centre of gravity of piston drive 600, but can rather be shifted slightly towards the centre of rotation D1 in parallel with the direction of movement of the piston.

Other setting tools besides those with a gas spring can also be realised with a decoupling device such as that formed with the help of an actuator 11 from FIG. 1. For example, extraordinarily powerful electrodynamic drives with moving, mutually repelling coils are known, e.g. from WO 2012/079572 A2 and WO 2014/056487 A2. For example, a setting tool can be realised in which, instead of a gas spring or a gas spring drive, an electrodynamic drive as shown in FIG. 2 of WO 2012/079572 A2 is used, its movable armature together with its excitation coil A serving as a moving "piston". However, the said electrodynamic drives are not ideally suitable as drives for setting tools for the following reasons:

(A) With strokes corresponding to the setting strokes of nail setting tools, the drive will have a prohibitively high mass.
(B) The piston speeds required in setting tools place high dynamic stresses on the flexible stranded wires supplying electricity to the drive.
(C) Where powder composite materials (SMCs) are used for the armature ("piston"), enabling particularly high electrical efficiencies, there is a risk of the armature breaking in the event of uncontrolled deceleration of the armature (for example when driving into a solid substrate or in case of mis-setting).

Against this background, a further embodiment of a hand-held setting tool comprises an electromagnetic drive, preferably with a Thomson coil actuator e.g. according to WO 2018/104406 A1 (see e.g. FIG. 1 of that patent), i.e. an electrodynamic drive with a first excitation coil, a soft magnetic frame, and a squirrel cage rotor and squirrel cage winding movably mounted along an axis, wherein the soft magnetic frame has a saturation flux density of at least 1.0 T and/or an effective specific electrical conductivity of at most 10^6 S/m. In this electromagnetic drive, the frame is designed as a "flux concentrator", the first excitation coil being directly or indirectly supported on the frame and formed, for example, from fibre-reinforced flat wire. In this embodiment, the handheld setting tool further comprises the decoupling device explained above, wherein the movably mounted squirrel cage rotor or movably mounted squirrel cage winding is formed in a (e.g. slidingly mounted) movable element (piston, armature) which effects the movement process of the first moving part or piston in the actuator ("striking mechanism"). As explained above, the movement process of the first moving part or piston, effected or driven by the moving squirrel cage rotor, is at least partially decoupled from the movement of the second moving part or piston in the actuator for driving the nail or bolt, leading to a reduction of the recoil when driving into solid substrates.

Another alternative embodiment of a hand-held setting tool comprises an electromagnetic drive according to for example WO 2012/079572 A2 or WO 2014/056487 A2 (as further explained below), i.e. an electromagnetic drive comprising at least a first coil and a second coil, wherein the first coil is formed on or in a flux concentrator and the second coil is a moving coil. In this embodiment, the moving coil is formed in or on a moving element (piston, armature) that effects the movement process of the first moving part or piston in the actuator ("striking mechanism"). As explained above, the movement process of the first moving part or piston, effected or driven by the moving coil, is at least partially decoupled from the movement of the second moving part or piston in the actuator for driving the nail or bolt, resulting in a reduction of the recoil.

Via these embodiments, problem (A) is eliminated by the decoupling device.

Problem (B) concerning electrodynamic drives with moving coils can also be solved by the decoupling device, since with an electric drive having a short, limited stroke (compared to the setting stroke), the stranded wires can be much shorter and are accordingly subjected to lower inertial forces during operation; furthermore, the supply of electricity to the moving coil(s) can if necessary be solved by sliding contacts.

Problem (C) can also be solved by the decoupling device, as the deceleration of the armature ("piston") now takes place in a defined manner: due to the gas cushion formed between the two pistons of actuator 11 during a setting operation, the "armature" or piston of the electric actuator, for example, does not encounter a hard stop.

In further embodiments of electrodynamic drives with moving coils, resetting the drive can be achieved in a simple manner: To drive a nail, the coils are at least temporarily energised in opposite directions (particularly preferably with the aid of capacitor discharge), so that repulsive forces act between the coils. The opposing current flow preferably also leads to a mutual compensation of the resulting electromagnetic far field, so that lower demands are placed on the shielding properties of the setting tool's housing. To reset the drive, on the other hand, the coils can be energised in the same direction so that an attractive (Lorentz) force acts between the coils.

Figure 7:
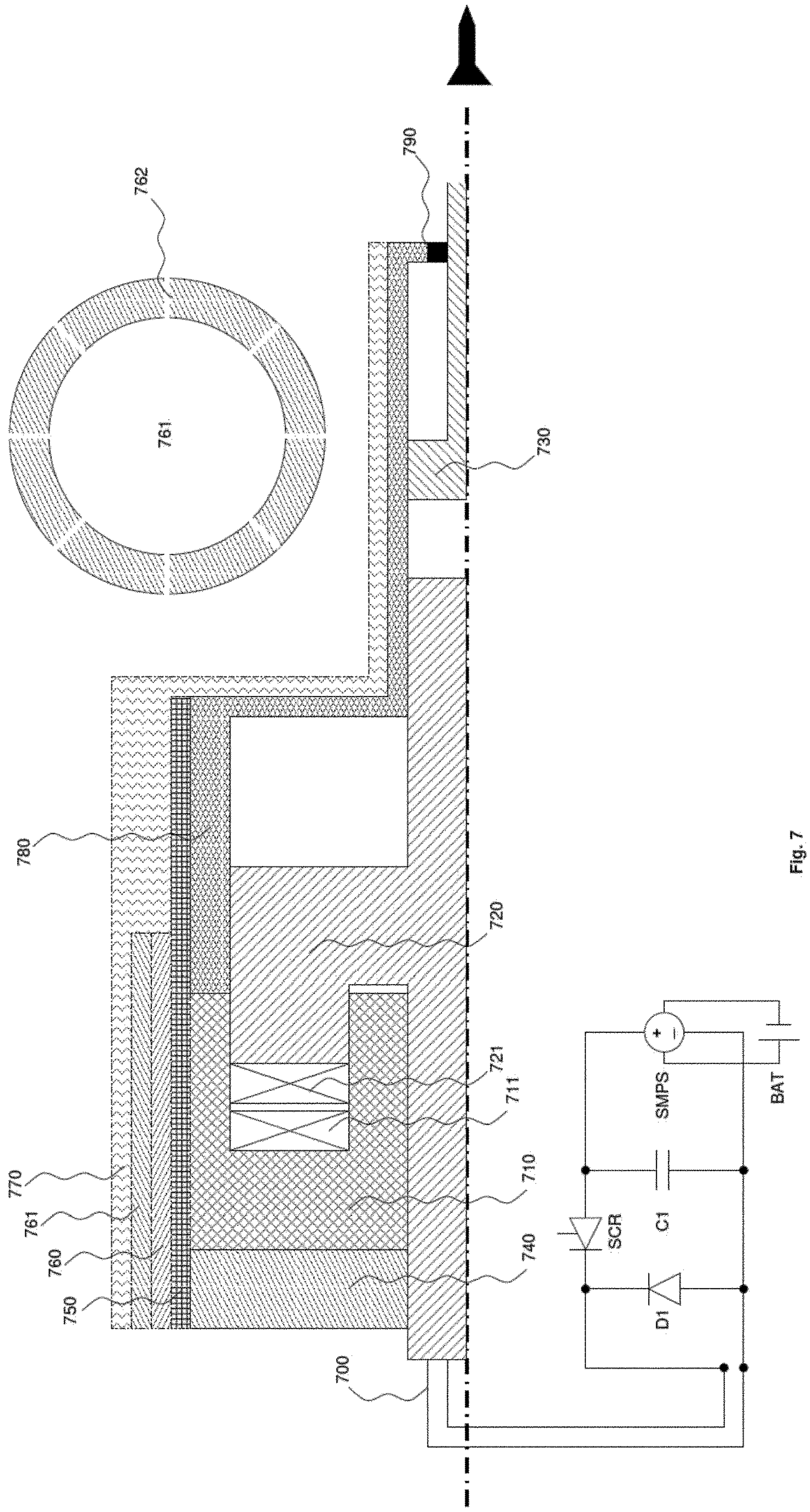
FIG. 7 shows a handheld setting tool according to one embodiment.

FIG. 7 shows a further embodiment comprising an electrodynamic piston drive with moving coils combined with a decoupling device, e.g. actuator 11 from FIG. 1. This is a particularly effective variant of the electrodynamic drive which is able to accelerate a mainly non-metallic working piston very efficiently with the aid of at least one moving coil, and which is characterised by a higher electrical efficiency and a lower tool mass for the same nail driving energy compared to the state of the art. The following embodiments are again in no way to be understood as restrictions. FIG. 7 schematically illustrates the setting tool in the "ready to fire" position.

The reference numbers in FIG. 7 represent:

700: Supply cables (highly flexible stranded wires)

710: Magnetic circuit (also "flux concentrator"), i.e. a body made of soft magnetic material. Very preferably, the magnetic circuit has a saturation flux density of at least 1 T, preferably at least 1.5 T and more preferably at least 1.9 T, and in particular an effective electrical conductivity of at most 10^6 S/m, more preferably at most 10^5 S/m and more preferably at most 10^4 S/m; a number of soft magnetic composite materials meet these requirements. Because of their brittleness, if a soft magnetic composite material is used for magnetic circuit 701, it must, where appropriate, be expertly segmented in order to avoid any cracking of 701. The purpose of the segmentation is thus to prevent the tensile strength (and preferably also the yield strength) of the soft magnetic composite material from being locally exceeded during a setting operation.

711: First flat coil ("support coil") attached to the magnetic circuit

720: Drive piston, preferably formed entirely or predominantly from a plastic, in particular a glass fibre-filled liquid crystal polymer, which can be configured to have at least one guide axis

721: Second, moving flat coil ("thrust coil") attached to or cast into the drive piston or overmoulded with its material

730: Setting piston with piston rod. Driving energy is transferred to the nail via the piston rod of the setting piston 730

740: Base plate made of soft magnetic solid material, in particular a ferritic steel, serves as shielding (EMC, EMCE) and as heat sink

750: Tube made of CFRP, serves in particular for strain relief of magnetic circuit 710 and for centring of 710 and 780

760: Tube made of an aluminium alloy, preferably having the highest possible electrical conductivity, and here serving to shield alternating electromagnetic fields

761: Tubular soft magnetic material with high saturation flux density, in particular ferritic steel. Serves to shield direct electromagnetic fields. Next to the figure is a plan view of tube 761 with discrete air gaps 762 distributed around the circumference, which here can serve as slots to reduce eddy currents

770: Tool casing

780: Cylinder, made for example from a high-strength, easily polishable steel

790: Armoured carbon or other guide ring for the piston rod of the setting piston 730

To drive a nail or bolt into a substrate with the arrangement schematically illustrated shown in FIG. 7, capacitor C1 is first charged via the switched-mode power supply SMPS (naturally in the case of a battery-operated setting tool, with electrical energy from the rechargeable battery(ies) BAT). Capacitor C1 should have the highest possible energy density, the lowest possible electrical series resistance and particularly high short-circuit resistance. Such capacitors are commercially available as film capacitors especially for pulse applications.

After reaching the desired charging voltage via C1, the thyristor SCR can be fired to drive a nail. Current now flows via the supply cables 700 into the (flat) coils. Both coils are preferably connected in series in such a way that the current in both coils flows in opposite directions during the setting operation, i.e. they repel one another. Flat copper wire is particularly suitable for the coils in order to achieve the highest possible fill factor with minimal electrical resistance.

The supply cables 700 can be guided directly through piston 720 or its (rear) "guide axis"; very preferably, the supply cables consist of an aluminium alloy or copper, in particular in the form of fine, highly flexible stranded wires, and are strain-relieved outside piston 720, for example with the aid of carbon fibres or carbon fibre fabric: the decisive point is that the strain relief connected mechanically in parallel with the supply cables is made from a material of sufficient tensile strength—i.e. does not break under the given conditions—and has a higher tensile modulus than the electrical supply cables themselves which it is intended to relieve. The strain relief is preferably designed to protect the electrical conductors from a tensile stress (during or as a result of a setting operation) that exceeds their yield point or even their tensile strength. Further preferably, the material of the strain relief should have high specific strength. Carbon fibres and carbon fibre fabrics are able to meet these requirements. The drive piston 720 (first piston) is configured to form an actuator 11 with the setting piston 730 (second piston) and cylinder 780, i.e. a decoupling device as explained above (e.g. according to FIG. 1).

The preferably gas-dynamic seal designed in the manner of pistons of labyrinth piston compressors is not shown in FIG. 7, nor are any necessary guide elements and similar details. Devices for resetting the pistons are not shown either.

The invention can be practically implemented as follows: The drawing, including the circuit diagram, is converted into a FEM model and the geometry is parameterised, with corresponding (material) properties assigned to the individual components mentioned in the list of references. Real properties are assumed for the electrical components, therefore the circuit diagram is mapped in the model with a corresponding equivalent circuit diagram. For the gas compartments, at least the Van der Waals equation is applied and solved in order to approximate the corresponding gas forces on the surfaces; where appropriate, the gas dynamics can also be taken into account. The first flat coil 711 and the second moving flat coil 721 preferably have the same number of turns, so that they always generate (almost) equal magnetomotive forces as a result of their series connection. Parametric optimisation is then carried out ("parametric sweeps"), taking into account constructive, e.g. production-related requirements such as minimum wall thicknesses, representable (flat) wire thicknesses etc.; otherwise, (all) geometric parameters and the number of windings are varied and a Pareto optimum is sought, also taking into account the prices of parts, components and materials, and approval requirements (EMC, EMCE, etc.). Starting from the optimum arrived at in this way, a mechanical engineering design can then be produced, which will deviate from the initially simple FEM model due to issues of assemblability and production, will be more complex and may include further components that have to be taken into account. A new parametric FEM optimisation is then carried out on the basis of this design. This process, expertly carried out, results in an extraordinarily efficient setting tool after only a small number of iterations. For example, drives with a magnetic circuit having a diameter of only d=60 mm can easily achieve driving energies of over 500 J with efficiencies in the region of 50%. Up to now this energy range has been reserved for combustion-powered setting tools, in particular powder-actuated tools.

Further embodiments are given by:

E1. Handheld setting tool for driving nails or bolts into a substrate, comprising:
- at least one electrochemical energy store 90, for example a rechargeable battery or fuel cell
- at least one motor controller 80, preferably comprising an inverter
- at least one electric motor 70, preferably a brushless DC motor, further preferably of axial flux type
- at least one reduction gear 60, preferably a multi-stage planetary gearbox
- at least one tensioning device 50, preferably comprising a ratchet freewheel
- at least one lock 40
- at least one working gas reservoir 20 containing a working gas, which can also be a mixture of different pure gases, and
- at least one pneumatic actuator 10, wherein the pneumatic actuator 10 comprises at least one piston with a piston rod 01, is in fluid communication with working gas reservoir 20, and, together with working gas reservoir 20, forms a gas spring, actuator 10 having a stroke starting position in which the gas spring is under maximum tension and a stroke end position range in which the gas spring is under less tension, characterised in that, with the gas spring under maximum tension, the working gas reservoir 20 is subject to a working gas pressure of more than 10 bar, more preferably more than 20 bar, more preferably more than 40 bar, more preferably more than 60 bar, more preferably more than 80 bar, more preferably more than 100 bar and particularly preferably more than 120 bar, and wherein the volume of the working gas reservoir 20 is at least as large, preferably more than twice as large, more preferably more than three times as large, and more preferably more than four times as large as the maximum stroke volume of the pneumatic actuator 10, wherein for driving a nail the gas spring is first tensioned by supplying the electric motor 70 with electricity from energy store 90 with the aid of motor controller 80 and is controlled so as to drive tensioning device 50 via reduction gear 60, which in turn is able to convert the torque of reduction gear 60 into a force to displace the piston of actuator 10 against the pressure of the working gas, actuator 10 being locked by means of lock 40 after a desired piston position has been reached, the gas spring of actuator 10 and working gas reservoir 20 being thus kept in a state of higher tension, and, for driving a nail, lock 40 is released so that the gas spring relaxes, actuator 10 thus starts to move, and kinetic energy of the moving parts of actuator 10, comprising its piston, is then used to drive the nail, either directly or with the aid of an additional striking mechanism 11.

E2. Setting tool according to E1, characterised in that the setting tool is dimensioned such that, during a setting operation, the maximum kinetic energy of the moving parts of actuator 10, expressly comprising all parts permanently attached to the piston of actuator 10, reaches at least half of the driving energy ultimately acting on the nail.

E3. Piston for a pneumatic actuator and in particular a gas spring, characterised in that it comprises a plurality of piston rings, and in that axially, i.e. along the direction of movement of the piston, cavities are disposed between the piston rings or the piston is configured to have such cavities, which are preferably partially but not completely filled with a lubricant.

E4. Piston for a pneumatic actuator and in particular a gas spring, characterised in that it comprises a plurality of pistons, for example two pistons, not rigidly connected to one another, between which there is a fluid.

E5. Piston for a pneumatic actuator according to E4, characterised in that the fluid is a liquid lubricant.

E6. Piston for a pneumatic actuator according to claim E5, characterised in that the fluid is a non-Newtonian fluid, in particular a shear-thinning fluid, which preferably also has thixotropic properties.

E7. Piston for a pneumatic actuator according to E6, characterised in that the non-Newtonian and in particular structurally viscous fluid, which is preferably also thixotropic, is produced by dispersing one or more solid lubricants such as, for example, hBN and/or graphite and/or MoS2 and/or dissolving one or more oligomers or polymers in the liquid lubricant.

E8. Pneumatic actuator comprising a cylinder and a piston according to one or more of the pistons described in E3 to E7, characterised in that the cylinder is configured to incorporate a valve seat and that the piston is configured to act as a shut-off element for this valve seat or incorporates a corresponding shut-off element, so that the piston and cylinder together form a valve which can be closed by pressing, by means of sufficient external force, the piston and thus the shut-off element against the valve seat formed by or attached to the cylinder.

E9. Striking mechanism for a setting tool, characterised in that it transmits kinetic energy of a first piston of a piston drive to a moving part, for example a second piston, and the nail or bolt is driven wholly or predominantly by the kinetic energy of the moving part, the first piston and the moving part not being rigidly connected to one another, the first piston and the moving part being decoupled with regard to their stroke lengths.

E10. Striking mechanism for a setting tool, comprising at least a first and a second piston and a cylinder, wherein the pistons are disposed opposite one another, i.e. as in opposed piston engines, in the cylinder, wherein gas-dynamic seals such as, for example, labyrinth seals can preferably be provided as sealing means instead of piston rings, and wherein the first piston is driven to transmit momentum to the second piston via gas located between the pistons, and, for example via a piston rod, the kinetic energy of the second piston can be used to drive in a nail and/or bolt or for percussion drilling.

E11. Striking mechanism according to E10, characterised in that a resetting device is provided for a second piston.

E12. Striking mechanism according to claim E10 or E11, characterised in that the pistons and/or the running surface of the cylinder are hard chrome plated.

E13. Handheld setting tool comprising at least an axially movable piston drive mounted in or on the setting tool with one or more stroke starting positions and a stroke end position range a piston driveable by the piston drive and preferably having a mass of at most a quarter of the mass of the piston drive an openable lock which is able to fix the piston drive in one or more stroke starting positions a shock absorber, for example a hydraulic shock absorber a resetting device, for example a return spring, which is able to move the piston drive relative to the setting tool back from its stroke end position range to a stroke start position, characterised in that, in the course of a setting operation, the lock opens or can be opened so that the piston drive can move from a stroke start position towards the stroke end position range as a result of the recoil experienced by it, wherein this return travel of the piston drive can be braked by the shock absorber, wherein preferably the piston drive is braked by the shock absorber only after a return travel of a certain return travel distance, and the return travel distance is such that the nail or bolt is predominantly or, preferably, completely driven in before the shock absorber takes effect and brakes the return travel of the piston drive.

E14. Handheld setting tool according to E13, characterised in that, in the reference system of the setting tool, the extended paths of the centres of gravity of the piston or pistons are parallel to the extended movement path of a movable piston drive.

E15. Handheld setting tool according to E13 or E14, characterised in that the extended path(s) of the centre(s) of gravity of the piston or pistons pass through the centre of gravity of the piston drive at least during the driving of the nail or bolt, which is to be understood in the present case as meaning that, during the setting operation, the minimum distance of the said extended path(s) from the centre of gravity of the piston drive is always at least five times, but preferably more than ten times, less than the minimum distance of those extended paths from the centre of gravity of the entire setting tool.

E16. Handheld setting tool according to one or more of E13 to E15, characterised in that the setting tool comprises at least one handle, and that this handle is rotatably mounted relative to a part of the setting tool in or on which a piston drive is axially movably disposed, wherein at least one mechanical damper, for example a hydraulic shock absorber or a polymer damper, is provided to dampen a rotational movement between the handle and the part on which the handle is rotatably mounted, wherein a lock can be provided to block such rotational movement while no setting operation is taking place.

E17. Setting tool comprising a striking mechanism according to one or more of E9 to E13, wherein the piston drive is an electrodynamic drive and the mass accelerated by the piston drive is to be understood as a piston or comprises the mass of the first moving part of the striking mechanism according to E9.

E18. Setting tool according to E17, characterised in that the electrodynamic claim comprises at least one excitation coil and at least one moving second coil or a moving squirrel cage winding, which preferably can be disposed on a part made of soft magnetic material movably disposed along an axis of movement, said soft magnetic material preferably having a saturation flux density of at least 1.5 T and further preferably an effective specific electrical conductivity of at most 10^6 S/m.

E19. Handheld setting tool for driving a nail or bolt into a substrate, comprising: a drive 600, preferably a gas spring drive or an electrodynamic drive, driving a setting piston 610 which serves to drive the nail or bolt into the substrate; characterised in that the setting piston 610 has at most a quarter of the mass of the drive 600.

E20. Handheld setting tool according to E19, wherein drive 600 is axially movably disposed in the setting tool, preferably on guide elements 690.

E21. Handheld setting tool according to E20, comprising an openable lock 620 that is configured to fix the piston drive in one or more stroke starting positions; a shock absorber 640, for example a hydraulic shock absorber; a resetting device, for example a return spring that is configured to move the drive relative to the setting tool back from its stroke end position range to a stroke start position, wherein, in the course of a setting operation, the lock 620 opens or can be opened so that the drive 600 can move from a stroke start position A towards the stroke end position range as a result of the recoil experienced by it, wherein this return travel of the drive 600 can be braked by the shock absorber 640, wherein preferably the drive 600 is braked by the shock absorber 640 only after a return travel of a certain return travel distance, and the return travel distance is such that the nail or bolt is predominantly or, preferably, completely driven in before the shock absorber 640 takes effect and brakes the return travel of the drive.

The invention claimed is:

1. Handheld setting tool for driving a nail or bolt into a substrate, comprising:

a drive, driving an actuator (11) which serves to drive the nail or bolt into the substrate;

a decoupling device which at least partially decouples a first movement process of a first moving part or piston ($\mathbf{11}_1$) in the actuator (11), driven by the drive, from a second movement process of a second moving part or piston ($\mathbf{11}_2$) in the actuator (11) for driving the nail or bolt, the drive being a first electrodynamic drive or a second electrodynamic drive, wherein the first electrodynamic drive comprises: a first excitation coil; a soft magnetic frame, and a squirrel cage rotor or squirrel cage winding movably mounted along an axis formed in a movable element that effects the movement process of the first moving part or piston ($\mathbf{11}_1$) in the actuator (11), the soft magnetic frame having a saturation flux density of at least 1.0 T and/or an effective specific electrical conductivity of at most 10ˆ6 S/m, wherein the second electromagnetic drive comprises: at least a first coil (711) and a second coil (721), the first coil (711) being formed on and/or in a flux concentrator (710) and the second coil (721) being a moving coil formed in or on a movable element (720) which effects the movement process of the first moving part or piston (111) in the actuator (11).

2. Handheld setting tool according to claim 1, wherein the first moving part or piston ($\mathbf{11}_1$) is not rigidly connected to the second moving part or piston ($\mathbf{11}_2$).

3. Handheld setting tool according to claim 1, wherein a compressible fluid, preferably air, is located between the first moving part or piston ($\mathbf{11}_1$) and the second moving part or piston ($\mathbf{11}_2$).

4. Handheld setting tool according to claim 1, wherein the first moving part of piston ($\mathbf{11}_1$) has a first stroke length and the second moving part or piston ($\mathbf{11}_2$) has a second stroke length, the first and second stroke lengths being decoupled.

5. Handheld setting tool according to claim 1, wherein the actuator (11) further comprises a cylinder, wherein the first piston ($\mathbf{11}_1$) and the second piston ($\mathbf{11}_2$) are disposed opposite one another in the cylinder, and wherein at least one piston seal is formed in the cylinder.

6. Handheld setting tool according to claim 5, wherein the piston seal comprises at least:

one or more piston rings and/or a gas-dynamic seal, preferably of the labyrinth-piston compressor type.

7. Handheld setting tool according to claim 1, wherein a resetting device is configured for the second movable part or piston ($\mathbf{11}_2$).

8. Handheld setting tool according to claim 1, wherein the first moving part or piston ($\mathbf{11}_1$), the second moving part or piston ($\mathbf{11}_2$) and/or a cylinder running surface are hard chrome plated.

9. Handheld setting tool according to claim 1, further comprising a further actuator (10) in the drive, wherein the further actuator (10) effects the first movement process in the actuator (11).

10. Handheld setting tool according to claim 9, wherein a setting stroke of the second movable part or piston ($\mathbf{11}_2$) in the actuator (11) is independent of a travel of the further actuator (10).

11. Handheld setting tool according to claim 1, wherein during a setting operation an electric current in the first coil (711) flows at least temporarily in the opposite direction to an electric current in the second coil (721), such that the two coils repel one another.

12. Handheld setting tool according to claim 1, wherein the second moving part or piston ($\mathbf{11}_2$), as a setting piston (610) has at most a quarter of the mass of the drive (600).

13. Handheld setting tool according to claim 1, wherein the drive (600) is axially movably disposed in the setting tool.

14. Handheld setting tool according to claim 1, further comprising:

an openable lock (620) that is configured to fix the drive in one or more stroke starting positions;

a shock absorber (640), for example a hydraulic shock absorber;

a resetting device, for example a return spring, that is configured to move the drive relative to the setting tool back from a stroke end position range to a stroke start position;

wherein, in the course of a setting operation, the lock (620) opens or can be opened so that the drive (600) can move from a stroke start position (A) towards the stroke end position range as a result of the recoil experienced by it, wherein this return travel of the drive (600) can be braked by the shock absorber (640), the drive (600) preferably being braked by the shock absorber (640) only after a return travel of a certain return travel distance (s'), and the return travel distance being such that the nail or bolt is predominantly or, preferably, completely driven in before the shock absorber (640) takes effect and brakes the return travel of the drive.

15. Handheld setting tool according to claim 1, wherein, in the reference system of the setting tool, an extended path of the centre of gravity (S1) of the second moving part or piston ($\mathbf{11}_2$, 610) is parallel to the extended movement path of a movable drive.

16. Handheld setting tool according to claim 15, wherein at least during the driving of the nail or bolt the extended path of the centre of gravity (S1) of the second moving part or piston (11$_2$, 610) passes as near as possible through the centre of gravity (S2) of the drive, the minimum distance of the extended path (S1) from the centre of gravity (S2) of the drive being always at least five times, but preferably more than ten times, less than the minimum distance of the extended path from the centre of gravity of the entire setting tool during the setting operation.

17. Handheld setting tool according to claim 1, wherein the setting tool comprises at least one handle (630), the handle (630) being rotatably mounted relative to a part of the setting tool, an axially movable drive being disposed in or on the setting tool, wherein at least one mechanical damper (641), for example a hydraulic shock absorber or a polymer damper, is provided to dampen a rotational movement between the handle (630) and the part on which the handle is rotatably mounted, wherein at least one device (621) can be provided to block such rotational movement while no setting operation is taking place.

* * * * *